United States Patent
Kim et al.

(10) Patent No.: US 8,714,327 B2
(45) Date of Patent: May 6, 2014

(54) GEAR SHIFTING SYSTEM FOR ELECTRIC VEHICLE

(75) Inventors: Kyungha Kim, Gyeonggi-do (KR); Min Sung Kim, Seoul (KR); Baekyu Kim, Gyeonggi-do (KR); Jinsook Lee, Gyeonggi-do (KR); Yeonho Kim, Gyeonggi-do (KR); Wan Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 138 days.

(21) Appl. No.: 13/173,597

(22) Filed: Jun. 30, 2011

(65) Prior Publication Data

US 2012/0118090 A1   May 17, 2012

(30) Foreign Application Priority Data

Nov. 16, 2010   (KR) .................. 10-2010-0113839

(51) Int. Cl.
  *F16D 11/14*   (2006.01)
  *F16D 23/06*   (2006.01)
  *F16H 63/30*   (2006.01)
  *F16H 63/38*   (2006.01)

(52) U.S. Cl.
  USPC .................. 192/48.91; 192/53.51; 192/69.62; 192/108

(58) Field of Classification Search
  CPC ................................. F16D 2001/002
  USPC ...................... 192/203, 53.5, 53.51
  See application file for complete search history.

(56) References Cited

U.S. PATENT DOCUMENTS

| | | | | |
|---|---|---|---|---|
| 1,102,427 | A * | 7/1914 | Morgan | 74/372 |
| 2,735,528 | A * | 2/1956 | Dodge | 192/48.91 |
| 3,086,633 | A * | 4/1963 | Winter | 192/53.361 |
| 4,019,586 | A * | 4/1977 | Hauser | 192/48.91 |
| 4,088,037 | A * | 5/1978 | Carr | 74/371 |
| 4,335,429 | A * | 6/1982 | Kawakatsu | 701/102 |
| 4,405,029 | A * | 9/1983 | Hunt | 180/65.25 |
| 4,428,469 | A * | 1/1984 | Morscheck et al. | 192/53.332 |
| 5,105,927 | A * | 4/1992 | Frost | 192/53.31 |
| 6,230,577 | B1 | 5/2001 | Showalter et al. | |
| 2002/0063030 | A1* | 5/2002 | Fernandez | 192/53.341 |
| 2002/0084164 | A1* | 7/2002 | Burger | 192/48.91 |

FOREIGN PATENT DOCUMENTS

| | | |
|---|---|---|
| JP | 05176409 A | 7/1993 |
| JP | 62-68773 A | 9/1994 |
| JP | 08156653 A | 6/1996 |
| JP | 2004150450 A | 5/2004 |
| JP | 2005-163833 A | 6/2005 |
| KR | 1998-022403 | 7/1998 |
| KR | 10-2003-0050732 | 6/2003 |

* cited by examiner

*Primary Examiner* — David D Le
*Assistant Examiner* — Mark Manley
(74) *Attorney, Agent, or Firm* — Edwards Wildman Palmer LLP; Peter F. Corless

(57) ABSTRACT

A gear shifting system is described that includes an first shaft that is connected to a motor to be rotated thereby, a synchronizing gear, a first insert unit and a second insert unit protrude at both sides thereof, a first gear and a second gear configured to rotate around the first shaft, a first plate and a second plate, a first engagement aperture and a second engagement aperture, and a second shaft. The second shaft is configured to move the synchronizing gear in an axial direction so that the first insert unit is inserted into the first engagement aperture or the second insert unit is inserted into the second engagement aperture to transfer a torque of the synchronizing gear to the first gear or the second gear.

1 Claim, 2 Drawing Sheets

GEAR SHIFTING SYSTEM FOR ELECTRIC VEHICLE

CROSS-REFERENCE TO RELATED APPLICATION

This application claims priority to and the benefit of Korean Patent Application No. 10-2010-0113839 filed in the Korean Intellectual Property Office on Nov. 16, 2010, the entire contents of which are incorporated herein by reference.

BACKGROUND OF THE INVENTION (a) Field of the Invention

The present invention relates to a gear shifting system for an electric vehicle that effectively transfers a driving torque of a motor to a wheel and increases or decreases a rotation speed and a torque of an input shaft.

(b) Description of the Related Art

Generally, a motor in an electric vehicle is operated at a single speed or second speed. If a single speed is used, a capacity of the motor must be increased and therefore often times a second speed system is used to effectuate a better performance from the motor.

Since batteries in electric vehicles have limits as to storage capacity, their associated travel distance is often low compared to fuel combustion type vehicles. Additionally, a manual transmission is often used so as to improve power efficiency, and recently an automatic transmission has been being applied to the electric vehicle as well.

Accordingly, automatic transmission systems that utilize a synchronizing device and an actuator, having a first/second speed have been developed to meet the on going demand from consumers. However, this synchronizing device used in the current automatic transmission systems is complicated in structure and expensive thus adding to the overall cost of producing automatic transmissions in electric cars.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a gear shifting system for an electrical vehicle having advantages of realizing a first/second speed with a simple and less expensive structure.

A gear shifting system according to an exemplary embodiment of the present invention may include an input shaft that is connected to a motor to be rotated thereby, and a synchronizing gear that rotates together with the input shaft. The synchronizing gear is disposed on the input shaft to slide in an axial direction thereof, and a first insert unit and a second insert unit protrude at both sides thereof. Further, a first gear and a second gear that are disposed to face both side surfaces of the synchronizing gear and are configured to rotate on the input shaft. A first plate and a second plate are fixed on the first gear and the second gear respectively to face the synchronizing gear and a first engagement aperture and a second engagement aperture that the first insert unit and the second insert unit are inserted thereto are formed. A shifting shaft is configured to move the synchronizing gear in an axial direction such that the first insert unit is inserted into the first engagement aperture or the second insert unit is inserted into the second engagement aperture to transfer torque from the synchronizing gear to the first gear or the second gear.

In this illustrative embodiment of the present invention, the input shaft may be disposed to penetrate a rotation center of the synchronizing gear and the input shaft and the synchronizing gear may be engaged with a spline.

Furthermore, the input shaft may be disposed to penetrate a rotation center of the first gear and the second gear and a shaft bearing may be interposed between the first gear and the input shaft or between the second gear and the input shaft.

The first plate and the second plate may have a circular ring shape and the first engagement aperture or the second engagement aperture may be arranged with a predetermined distance along the first plate or the second plate.

The first insert unit or the second insert unit that are fixed on both sides of the synchronizing gear may include an outside housing that is fixed on a side surface of the synchronizing gear, an inside housing that is inserted into the outside housing and a front end portion thereof that protrudes an outward, and a ball that is disposed at a front end portion of the inside housing to rotate and one side thereof protrudes outward.

An elastic member may be disposed in the outside housing to elastically supports the inside housing outwardly and a ball bearing may be disposed in the outside housing to contact an exterior circumference of the ball.

As stated above, the gear shifting system for an electric vehicle according to an exemplary embodiment of the present invention uses a simplified structure to perform first/second speed operations, thus, simplifying the fabrication, the assembly, and the maintenance thereof.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
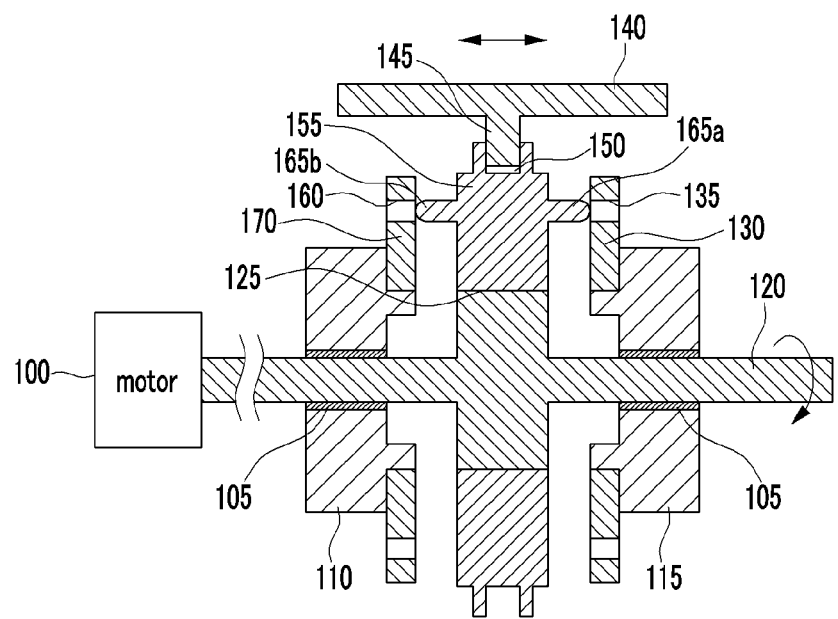
FIG. 1 is a schematic entire side-view showing a gear shifting system for an electric vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

An exemplary embodiment of the present invention will hereinafter be described in detail with reference to the accompanying drawings.

FIG. 1 is a schematic entire side-view showing a gear shifting system for an electric vehicle according to an exemplary embodiment of the present invention. Referring to FIG.

1, a gear shifting system for an electric vehicle includes a motor 100, an input shaft 120, a first gear 115, a second gear 110, a shaft bearing 105, a first plate 130, a second plate 170, a synchronizing gear 155, a first insert unit 165a, a second insert unit 165b, and shifting shaft 140.

The input shaft 120 is disposed and the second gear 110 and the first gear 115 are disposed on one side and the other side of the input shaft 120, respectively. The second gear 110 and the first gear 115 are fixed in an axial direction of the input shaft 120. Further, a shaft bearing 105 is interposed between the second gear 110 and the input shaft 120 and between the first gear 115 and the input shaft 120 such that the second gear 110 and the first gear 115 rotates around the input shaft 120.

The synchronizing gear 155 is disposed on and operably connected to the input shaft 120 between the second gear 110 and the first gear 115. The synchronizing gear 155 is illustratively engaged with the input shaft 120 through a spline portion 125 to move on the input shaft 120 in an axial direction and to rotate together with the input shaft 120.

The second plate 170 is disposed to be fixed on a side surface of the second gear 110 facing the synchronizing gear 155 and the first plate 130 is disposed to be fixed on a side surface of the first gear 115 facing the synchronizing gear 155. The second gear 110 and the second plate 170 rotate together and the first gear 115 and the first plate 130 rotate together. The second gear 110 and the first gear 115 selectively transmit rotation of the input shaft 120 to a driving wheel (not shown) through a non-illustrated output shaft.

The second insert unit 165b and the first insert unit 165a protrude from both sides of the synchronizing gear 155 corresponding to the second plate 170 and the first plate 130 and the second insert unit 165b and the first insert unit 165a rotate together with the synchronizing gear 155.

A first engagement aperture 135 is formed in the second plate 170 corresponding to the second insert unit 165b and a second engagement aperture 160 is formed in the first plate 130 corresponding to the first insert unit 165a. The shifting shaft 140 is disposed at an upper side of the synchronizing gear 155, a groove 150 is formed at an exterior circumference of the synchronizing gear 155, and a protrusion 145 is formed on one side of the shifting shaft 140 to be inserted into the groove 150.

If the shifting shaft 140 moves in an axial direction of the input shaft 120 by an actuator (not shown), the synchronizing gear 155 moves in an axial direction of the input shaft 120 by the engagement of the protrusion 145 and the groove 150. If the synchronizing gear 155 moves to the left side on the input shaft 120, the second insert unit 165b is inserted into the first engagement aperture 135 in a way that a rotation of the input shaft 120 and the synchronizing gear 155 is transmitted to the second plate 170 and thus on to the second gear 110.

Further, if the synchronizing gear 155 moves to the right side on the input shaft 120, the first insert unit 165a is inserted into the second engagement aperture 160 in a way that a rotation of the input shaft 120 and the synchronizing gear 155 is transmitted to the first plate 130 and thus on to the first gear 115.

As shown, each front end portion of the second insert unit 165b and the first insert unit 165a is formed as a circular shape to be smoothly inserted into the first engagement aperture 135 and the second engagement aperture 160 such that the gear shifting is smoothly performed.

As described above, a gear shifting system according to an exemplary embodiment of the present invention uses a simplified structure to perform gear shifting of 1-2 steps and thus structure is simplified so that the production/assembly and the maintenance is also simplified, thus reducing overall costs of the automatic transmission.

Figure 2:
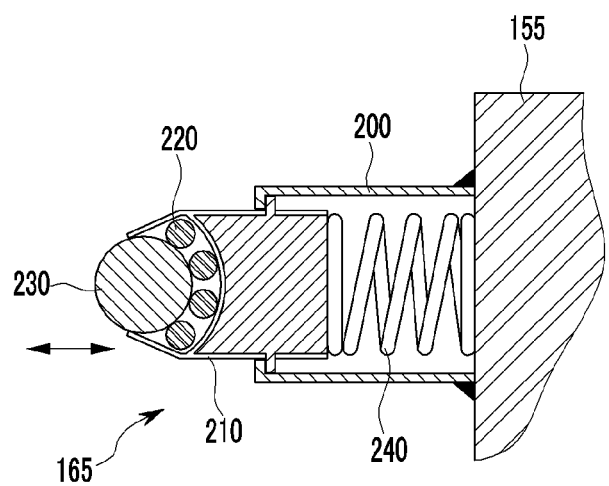
FIG. 2 is 'A' portion of FIG. 1 that is a partial detailed cross-sectional view showing a gear shifting system for an electric vehicle according to the exemplary embodiment of the present invention.

FIG. 2 is 'A' portion of FIG. 1 that is a partial detailed cross-sectional view showing a gear shifting system for an electric vehicle according to an exemplary embodiment of the present invention. Referring to FIG. 2, the second insert unit 165b that is fixed on a side surface of the synchronizing gear 155 includes an outside housing 200, an inside housing 210, a ball 230, and a ball bearing 220.

The outside housing 200 is fixed on a side surface of the synchronizing gear 155, a rear end of the inside housing 210 is inserted into the outside housing 200, and a front end thereof protrudes outside of the outside housing 200. The ball 230 is mounted on a front end portion of the outside housing 200 which is rotatably disposed at the front end portion of the outside housing 200, and a ball bearing 220 contacts one side of the exterior circumference of the ball 230 such that the ball 230 smoothly rotates. The elastic member 240 is mounted in the outside housing 200 and the elastic member 240 elastically supports the outside housing 200 outwardly such that the outside housing 200 is protruded outward.

If the synchronizing gear 155 moves to the left side, the ball 230 contacts a side surface of the second plate 170, the ball 230 rotates by a rotation speed difference of the synchronizing gear 155 and the second plate 170, and the outside housing 200 overcomes an elastic force of the elastic member 240 to be inserted into the outside housing 200 such that a shock of the gear shifting is decreased. If the synchronizing gear 155 rotates further, the ball 230, the outside housing 200, and the inside housing 210 are sequentially inserted into the first engagement aperture 135 of the second insert unit 165b.

It is desirable that the second plate 170 and the first plate 130 have a ring like shape and the first engagement aperture 135 and the second engagement aperture 160 are arranged with a predetermined distance from each other along the second plate 170 and the first plate 130.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: motor
105: shaft bearing
110: second gear
115: first gear
120: input shaft
125: spline portion
130: first plate
135: second engagement aperture
140: shifting shaft
145: protrusion
150: groove
155: synchronizing gear
160: second engagement aperture
165a: first insert unit
165b: second insert unit
170: second plate
200: outside housing
210: inside housing
220: ball bearing
230: ball
240: elastic member While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gear shifting system for an electric vehicle, comprising:
   an input shaft connected to a motor to be rotated thereby;
   a synchronizing gear configured to rotate together with the input shaft, disposed on the input shaft to slide in an axial direction thereof, and a first insert unit and a second insert unit protruding outward from both sides thereof;
   a first gear and a second gear disposed to face both side surfaces of the synchronizing gear and configured to rotate on the input shaft;
   a first plate and a second plate fixed on the first gear and the second gear as separate components from the first and second gear and face the synchronizing gear, respectively, wherein the first plate and the second plate project radially outward from an outer most circumference of the first and second gear, respectively;
   a first engagement aperture and a second engagement aperture that the first insert unit and the second insert unit are inserted thereto formed in the first plate and the second plate respectively; and
   a shifting shaft configured to move the synchronizing gear in an axial direction such that the first insert unit is inserted into the first engagement aperture or the second insert unit is inserted into the second engagement aperture to transfer a torque of the synchronizing gear to the first gear or the second gear respectively,
   wherein the first plate and the second plate have a circular ring shape and the first engagement aperture or the second engagement aperture is arranged with a predetermined distance along the first plate or the second plate,
   wherein the first insert unit and the second insert unit that are fixed on both sides of the synchronizing gear include:
   an outside housing fixed on a side surface of the synchronizing gear;
   an inside housing inserted into the outside housing and a front end portion thereof protrudes outward; and
   a ball {that} disposed at a front end portion of the inside housing to rotate therein and one side thereof protrudes outward therefrom, wherein a ball bearing is disposed in the inside housing to contact an exterior circumference of the ball, wherein the ball of each of the first insert unit and the second insert unit is inserted into the first and second engagement aperture respectively,
   wherein a radial distance from an axis of the input shaft to the first engagement aperture formed in the first plate is greater than a distance from the axis of the input shaft to an outer most circumferential surface of the first gear.

* * * * *